UNITED STATES PATENT OFFICE.

FRITZ PETERS, OF BERLIN, GERMANY.

COMPOSITION FOR PRESERVING WOOD.

1,265,370. Specification of Letters Patent. Patented May 7, 1918.

No Drawing. Application filed November 13, 1914. Serial No. 871,902.

*To all whom it may concern:*

Be it known that I, FRITZ PETERS, a subject of the King of Prussia and the German Emperor, residing at 40$^b$ Goltzstrasse, Berlin, Kingdom of Prussia, German Empire, have invented a new and useful Improvement in Compositions for Preserving Wood; and I do hereby declare the following to be a full, clear, and exact description of the same.

One has already proposed to preserve wood by impregnation with dinitrophenols or their salts. It is, however, impossible to use the free dinitrophenols, alone or with additions of other preserving means in iron vessels, because the free dinitrophenols are chemically changed by contact with iron, so that the fungicide and preserving power is diminished. This disadvantage enters especially, if the impregnating liquid containing free dinitrophenols is warmed, which is preferable for causing a complete and quick impregnation. The salts of dinitrophenols attack especially iron, if they are used with common ammonium sulfate, magnesium sulfate, sodium fluorid, or sodium sulfate as is usual for increasing the preserving power, especially against merculius fungi and for diminishing the inflammability of the impregnated wood. With reference to the quoted behavior of the dinitrophenols and their salts one could only use them by coating wood or by mere immersion, but not by pneumatic impregnation.

The purpose of the present invention is to procure a preserving agent which can be used in iron vessels without attacking them and which is suitable for pneumatic impregnation.

The impregnating composition consists of dinitrophenols or their salts and soluble inorganic salts of chromic acid or of boric acid, of phosphoric acid, of bromic acid or of iodic acid. Suitable salts are potassium chromate, potassium bichromate, sodium chromate, sodium bichromate, ammonium chromate, ammonium bichromate, dipotassiumphosphate, disodiumphosphate, diamsiumphosphate, potassium bromate, ammoniumphosphate, sodium bromate, sodium monium bromate, sodium iodate, ammonium iodate, potassium iodate. One may use the said salts mixed with each other. One may add to the composition fireproofing salts, as for instance ammonium sulfate, magnesium sulfate, sodium fluorid, sodium sulfate, alkali fluosilicate or such like.

A suitable composition consists of—

90–98 parts by weight of dinitrophenols,

10–2 parts by weight of potassium bichromate, or sodium bichromate, or potassium chromate or sodium chromate alone or mixed with each other or one or several of the other quoted salts.

Another suitable composition consists of—

80–90 parts by weight of dinitrophenols,

10–8 parts by weight of a soluble fireproofing salt, as for instance magnesium sulfate, 10–2 parts by weight of potassium bichromate or sodium bichromate or potassium chromate or sodium chromate alone or mixed with each other or one or several of the other quoted salts. For carrying out the impregnation one dissolves the mixture in water and introduces the solution into the wood by pressure or by exhausting the wood and introducing the liquid by atmospheric or higher pressure. The liquid may be used in warm state for instance at a temperature of 60–80 degrees centigrade. The impregnation may be carried out in iron vessels.

I claim:

1. A composition of matter for preserving wood containing $C_6H_3(NO_2)_2OR$, in which R represents either hydrogen or a monovalent metal.

2. A composition of matter for preserving wood, containing dinitrophenol and a soluble salt of an inorganic acid incapable of attacking iron.

3. A composition of matter for preserving wood, containing dinitrophenol, a soluble salt of an inorganic acid incapable of attacking iron, and a fireproofing soluble salt.

4. A composition of matter for preserving wood, containing dinitrophenol and a soluble inorganic salt of chromic acid.

In testimony whereof, I have signed my name to this specification in the presence of two subscribing witnesses.

FRITZ PETERS.

Witnesses:
WOLDEMAR HAUPT,
HENRY HASPER.